( 12 ) United States Patent
Danilov et al.

(10) Patent No.: US 10,346,066 B2
(45) Date of Patent: Jul. 9, 2019

(54) EFFICIENT ERASURE CODING OF LARGE DATA OBJECTS

(71) Applicant: EMC IP HOLDING COMPANY LLC, Hopkinton, MA (US)

(72) Inventors: Mikhail Danilov, Saint Petersburg (RU); Ivan Tchoub, Saint Petersburg (RU); Maxim Trusov, Saint Petersburg (RU); Chen Wang, Shanghai (CN); Yu N. Teng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 15/423,080

(22) Filed: Feb. 2, 2017

(65) Prior Publication Data

US 2017/0371571 A1    Dec. 28, 2017

(30) Foreign Application Priority Data

Jun. 27, 2016 (RU) ................................ 2016125443

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01)
(58) Field of Classification Search
CPC ........ G06F 3/067; G06F 3/0619; G06F 3/064; G06F 11/1076; G06F 11/1092; G06F 3/0689; G06F 11/2094; G06F 3/0614; G06F 3/065; G06F 3/0652; G06F 3/0653; G06F 8/437; G06F 17/30575
USPC ......................................................... 711/162
See application file for complete search history.

(56) References Cited

U.S. PATENT DOCUMENTS

| | | | |
|---|---|---|---|
| 2012/0060072 A1* | 3/2012 | Simitci | H03M 13/373 714/756 |
| 2013/0080862 A1* | 3/2013 | Bennett | G06F 11/1076 714/782 |
| 2014/0351486 A1* | 11/2014 | Baryudin | G06F 3/0619 711/103 |
| 2016/0041870 A1* | 2/2016 | Davis | H03M 13/353 714/773 |
| 2017/0286309 A1* | 10/2017 | Danilov | G06F 3/06 |

* cited by examiner

*Primary Examiner* — Hashem Farrokh
(74) *Attorney, Agent, or Firm* — Krishnendu Gupta

(57) ABSTRACT

A system, computer program product, and computer-executable method for use with a distributed storage system comprising a plurality of storage nodes each having attached storage devices, the system, computer program product, and computer-executable method including receiving a request, at a first storage node of the plurality of storage nodes, to store a large portion of data, using at least one of a first type of data chunk and a plurality of a second type of data chunks to store the large portion of data, processing each of the plurality of the second type of data chunks, processing each of the at least one of the first type of data chunk, and returning an acknowledgement to the request.

17 Claims, 14 Drawing Sheets

EFFICIENT ERASURE CODING OF LARGE DATA OBJECTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method for use with a distributed storage system comprising a plurality of storage nodes each having attached storage devices, the system, computer program product, and computer-executable method including receiving a request, at a first storage node of the plurality of storage nodes, to store a large portion of data, using at least one of a first type of data chunk and a plurality of a second type of data chunks to store the large portion of data, processing each of the plurality of the second type of data chunks, processing each of the at least one of the first type of data chunk, and returning an acknowledgement to the request.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Erasure Coding for Elastic Cloud Storage

Figure 1:
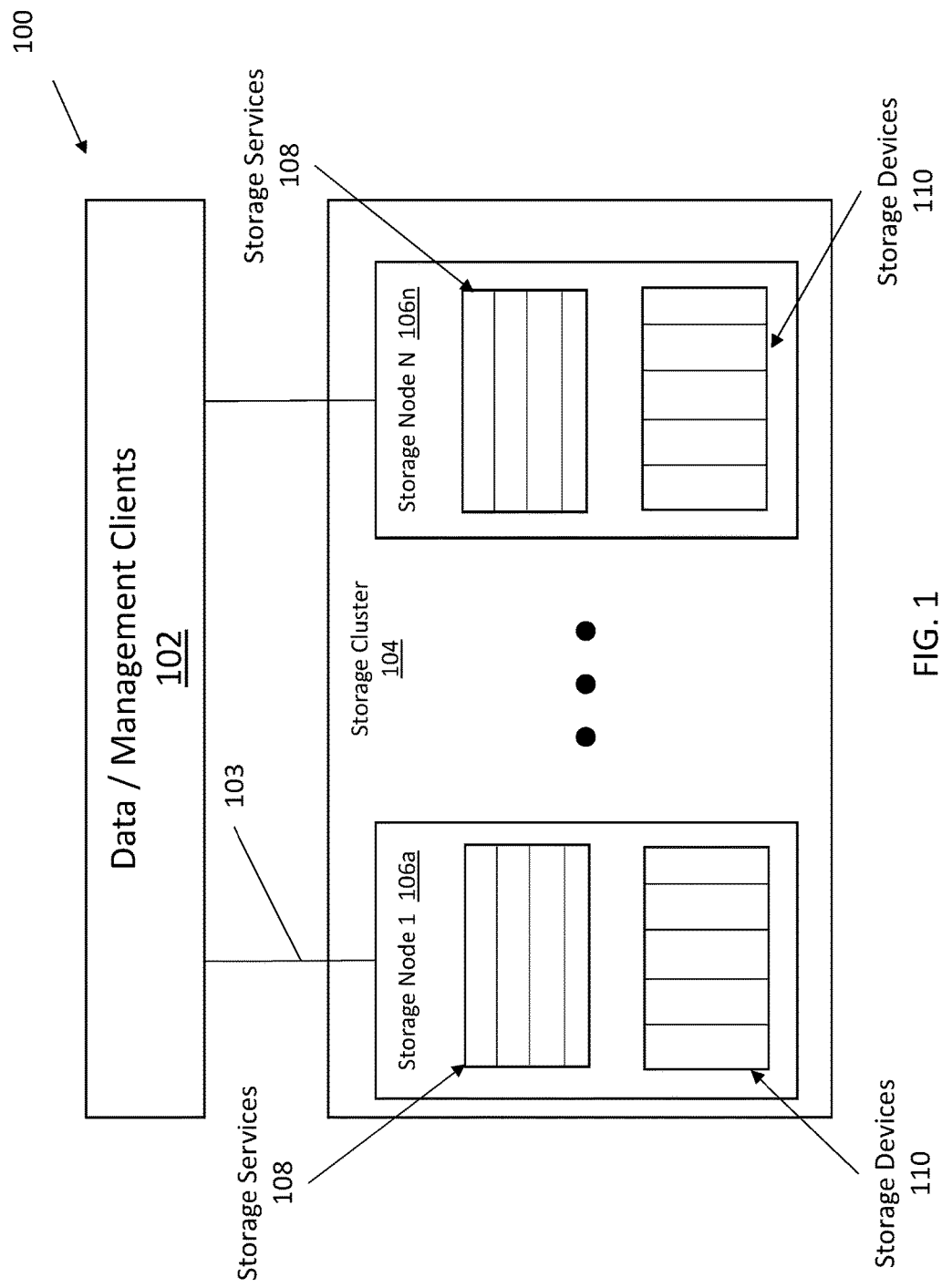
FIG. 1 shows a distributed storage system, in accordance with an embodiment of the disclosure.
Figure 1A:
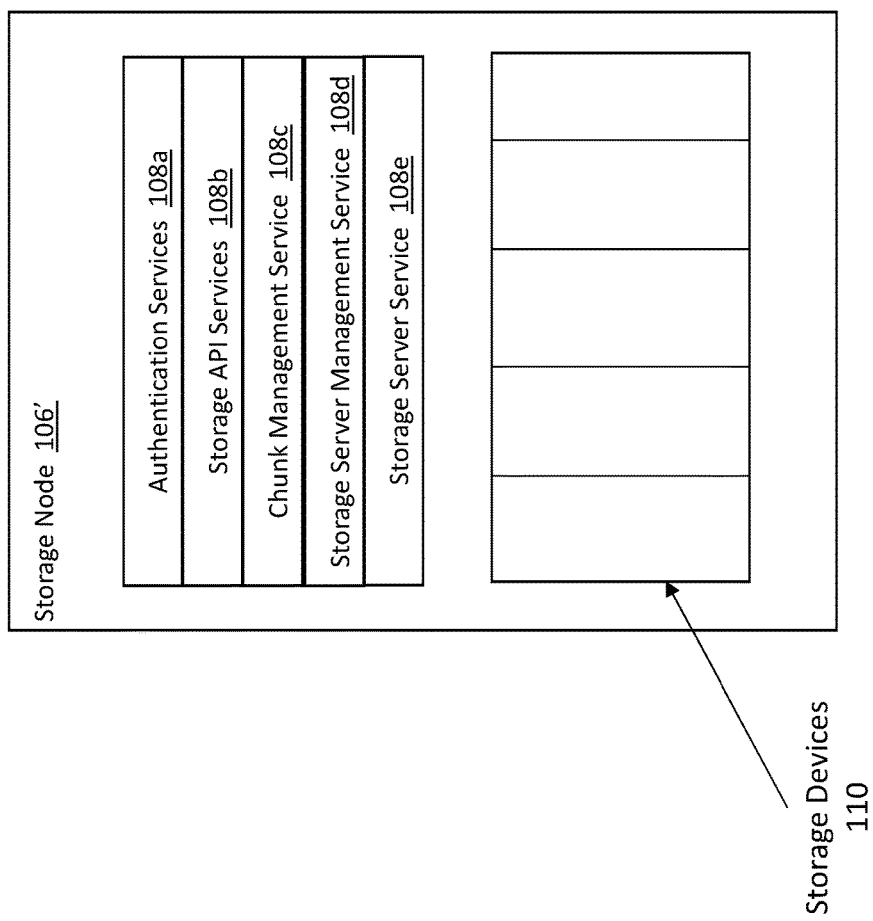
FIG. 1A shows an illustrative storage node, in accordance with an embodiment of the disclosure.

FIG. 1 shows a distributed storage system, in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides. In various embodiments, the cluster 104 uses erasure coding to protect data stored therein, as described below in conjunction with FIGS. 2-4.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

In some embodiments, the system 100 employs a flat cluster architecture whereby cluster-level services are distributed evenly among the nodes. To implement cluster-level services using a flat cluster architecture, processing may be coordinated and shared among several nodes using the concept of object ownership. An object stored within the system 100, including system objects and user data, may be owned by a single node 106 at any given time. When a node owns an object, it may be solely responsible for handling updates to the object or for performing other processing associated with the object. Notably, a given node may own an object (e.g., user data) without having a copy of that object's data stored locally (i.e., the object data can be stored on one or more remote nodes).

FIG. 1A shows a storage node, in accordance with an embodiment of the disclosure. A storage node 106' may be the same as or similar to a storage node 106 in FIG. 1. The illustrative storage node 106' includes one or more services 108 and one or more storage devices 110, as shown. A storage node 106' may include a processor (not shown) configured to execute instructions provided by services 108.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

Figure 2:
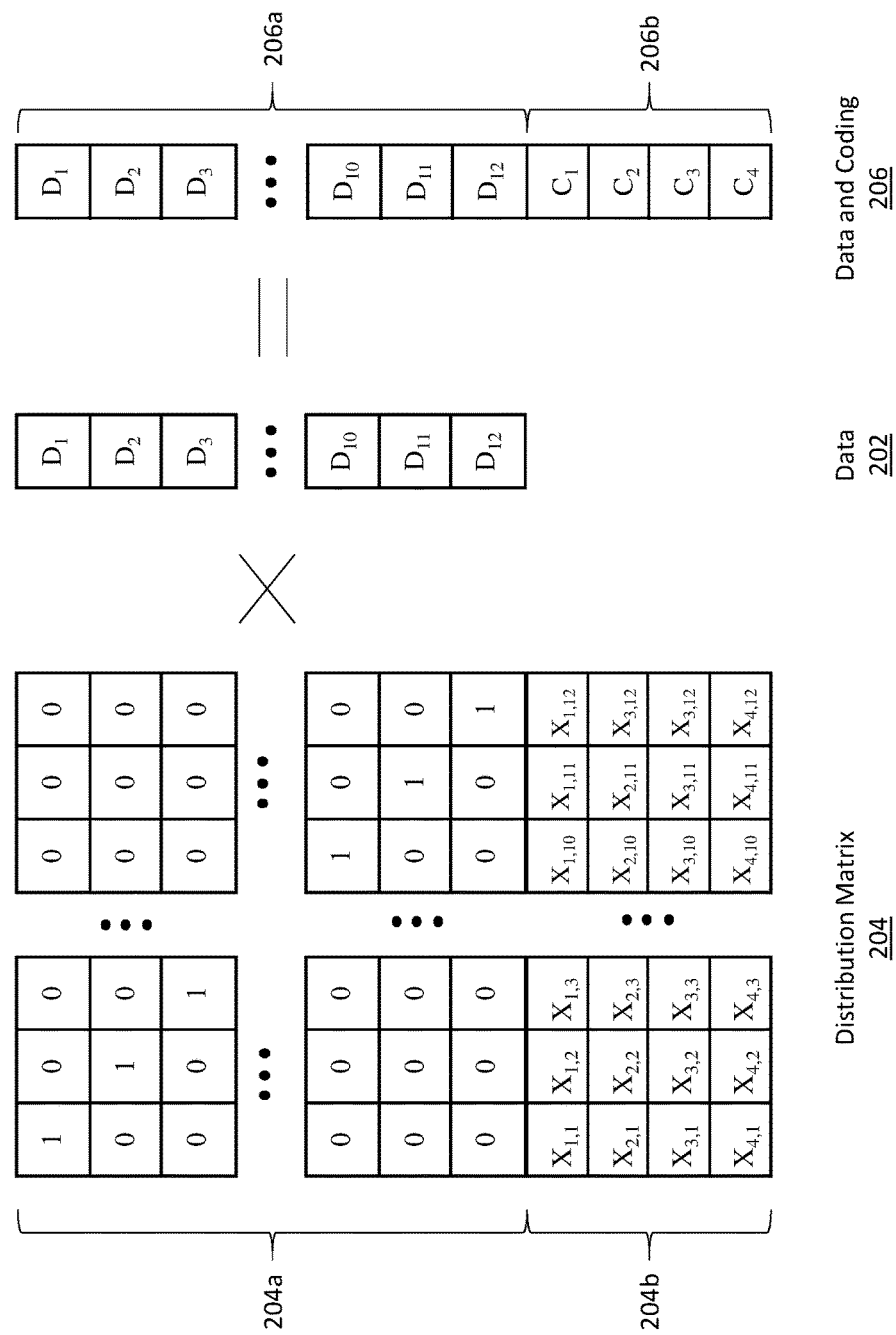
FIG. 2 shows a distributed storage system may use erasure coding for data protection, in accordance with an embodiment of the present disclosure.

Referring to FIG. 2, a distributed storage system may use erasure coding for data protection. Arbitrary data D may be divided into k fragments $D_1, D_2, \ldots, D_k$, which can be arranged as a column vector 202. All k fragments have equal size, with padding or other data complement being added as needed. The data column vector 202 can be multiplied with a distribution matrix 204 to generate m coded fragments $C_1, C_2, \ldots, C_m$. The coded fragments are considered to be "redundant" because they encode information that can be used to restore data fragments. In some embodiments, k is chosen to be 12 and m is chosen to be 4.

The distribution matrix 204 may be a (k+m)×k matrix comprising a first sub-matrix 204a having k rows and a second sub-matrix (referred to as the "coding matrix") 204b having m rows. The first sub-matrix 204a may be an identity matrix, as shown. In this form, the distribution matrix 204 can be multiplied by a data column vector 202 to result in a data-and-coding column vector 206 comprising the k data fragments 206a and the m coded fragments 206b.

The coding matrix 204b includes coefficients $X_{i,j}$ which may be selected using known erasure coding techniques. In some embodiments, the coding coefficients are selected such that the system can tolerate the loss of any m fragments. The coefficients $X_{i,j}$ may be selected based upon a specific erasure coding algorithm used.

It will be appreciated that the encoding process can be performed as m independent dot products using individual rows from the coding matrix 204b and the data column vector 202. In particular, the $i^{th}$ coded fragment $C_i$ can be calculated as the dot product of the $i^{th}$ row of the coding matrix 204b with the data column vector 202.

The data fragments $D_1, D_2, \ldots, D_k$ and coded fragments $C_1, C_2, \ldots, C_m$ may be distributed among the cluster storage nodes 106 (FIG. 1). The specific distribution of fragments-to-nodes (referred to as the "data layout") can be selected using a various criteria. For example, in some applications, the goal may be to store exactly one fragment per storage node 106.

If a data fragment $D_1, D_2, \ldots, D_k$ is lost (e.g., due to a node failure, a storage device failure, or data corruption), the lost fragment may be regenerated using a decoding matrix (not shown), available data fragments from $D_1, D_2, \ldots, D_k$, and coded fragments $C_1, C_2, \ldots, C_m$. The decoding matrix can be constructed as an inverse of modified distribution matrix 204 using known techniques (which may take into account which data fragments were lost). At least k unique available fragments (either data fragments or coded fragments) may be required to decode a lost data fragment.

Figure 3A:
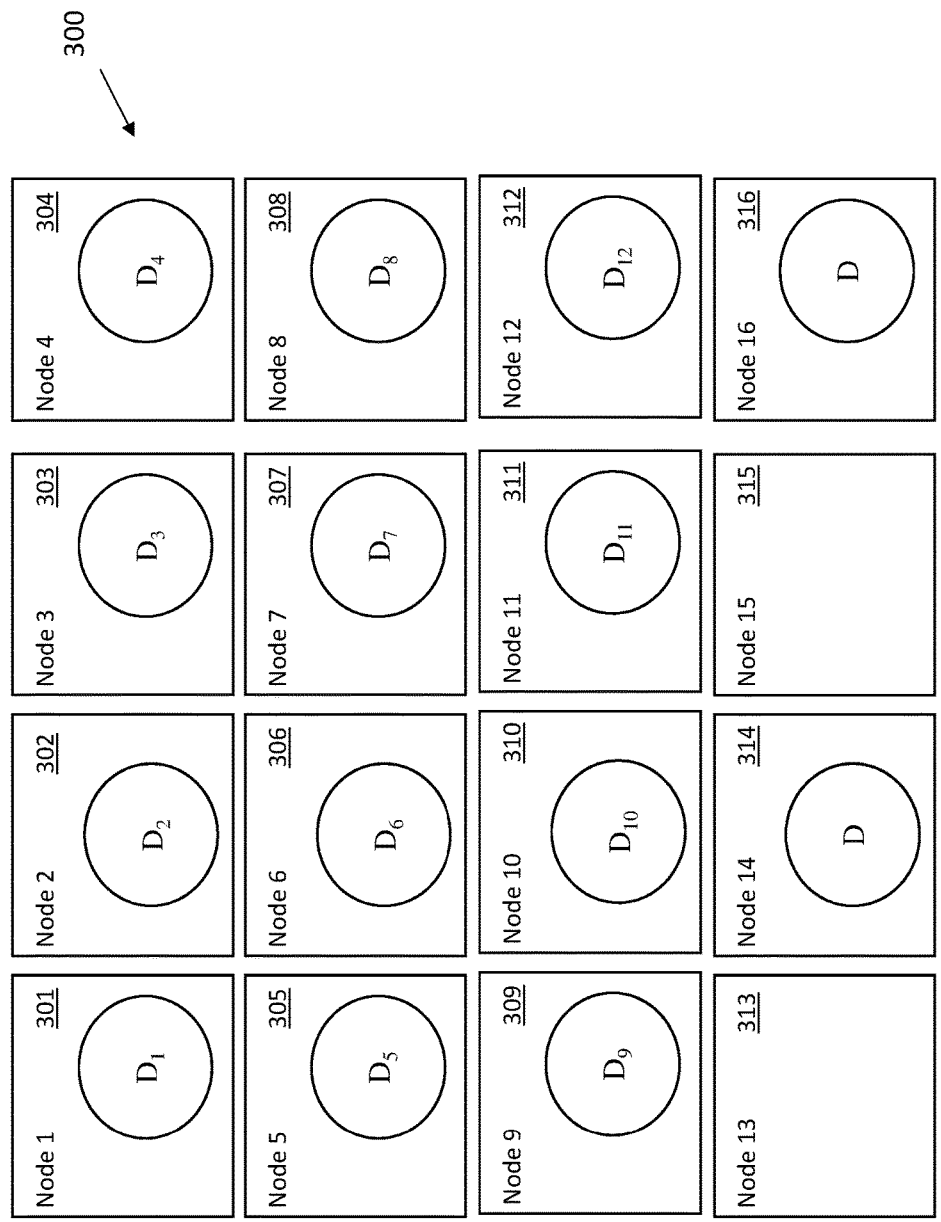
FIGS. 3A-3C illustrate a technique for efficiently performing erasure coding within a distributed storage system, according to various embodiments of the disclosure.
Figure 3B:
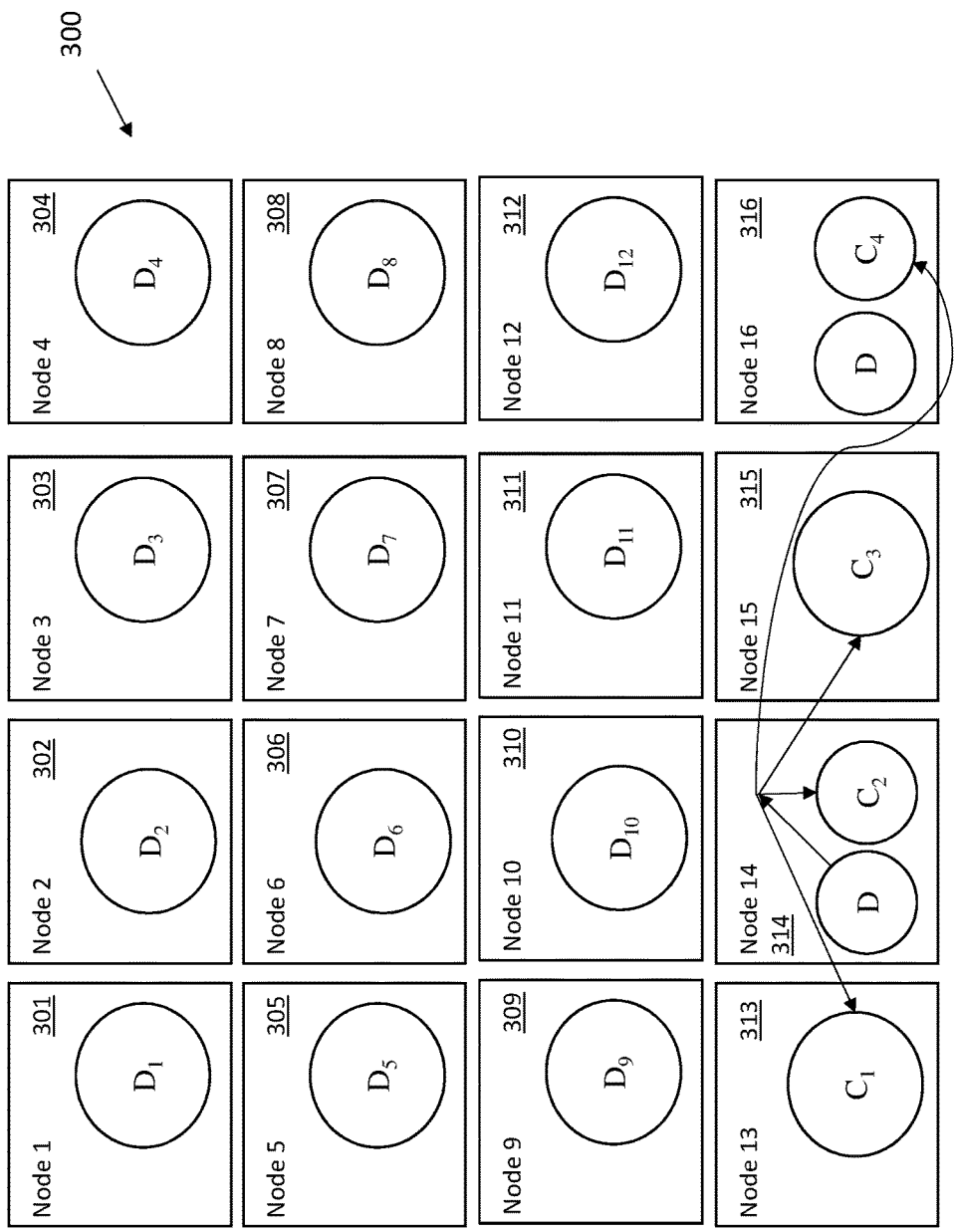
Figure 3C:
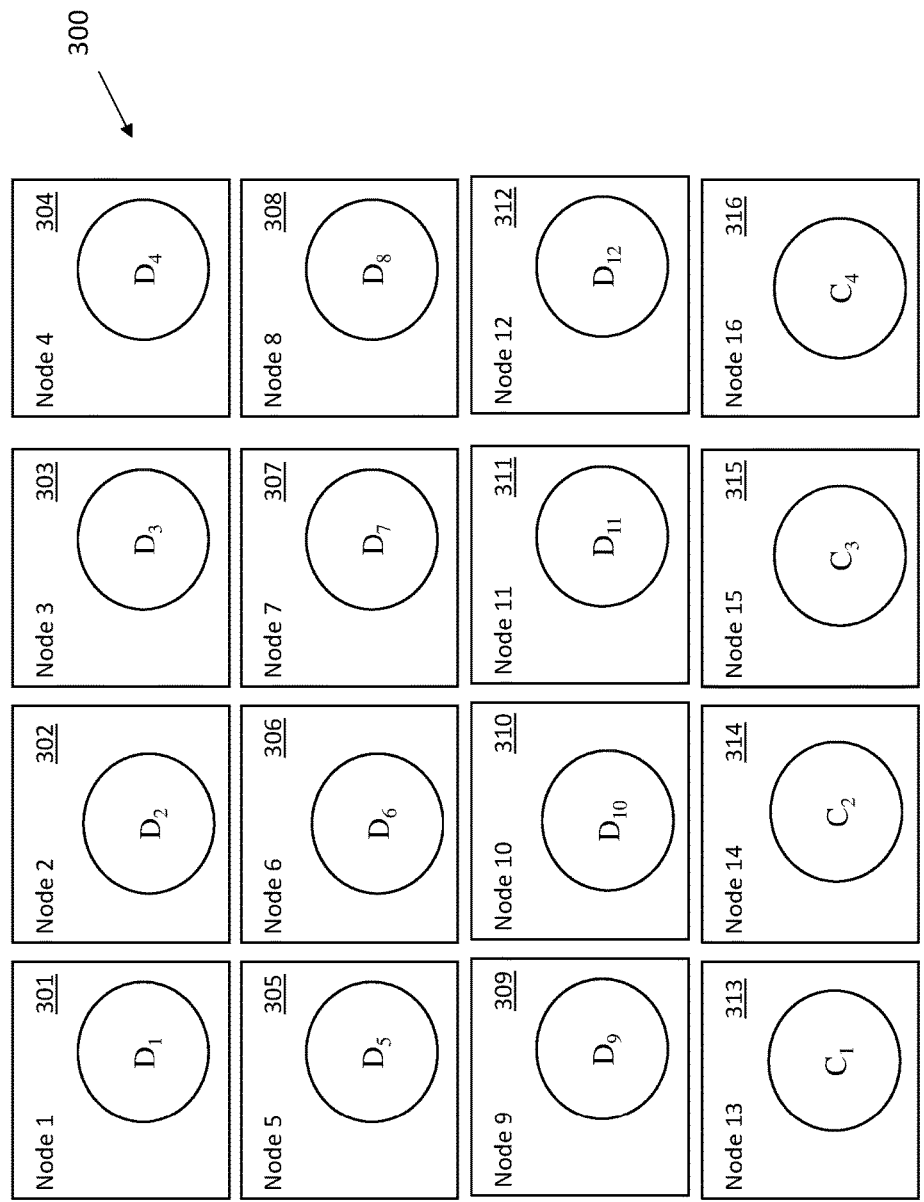

FIGS. 3A-3C illustrate a technique for efficiently performing erasure coding within a distributed storage system, according to various embodiments of the disclosure. Like elements may be shown using like reference designators throughout FIGS. 3A-3C.

Referring to FIG. 3A, an illustrative distributed storage system 300 includes a plurality of nodes 301-316, with sixteen (16) nodes shown in this example. Any node 301-316 may be the same or similar to the node 106' of FIG. 1A. When new data D is added to the system (e.g., via a client 102 request), the system 300 divides the data into k fragments $D_1, D_2, \ldots, D_k$, generates m coded fragments $C_1, C_2, \ldots, C_m$ therefrom, and stores the data and coded fragments across various nodes 301-316 using a suitable data layout.

To reduce the amount of time a user/client must wait when storing new data, the system 300 may use a delayed coding technique. As shown by example in FIG. 3A, an arbitrary node 311 receives a request from a client to store data D. Before sending an acknowledgement to the client, the receiving node 311 stores complete copies of the data across multiple different storage nodes. The receiving node 311 may also divide the data fragments and store the fragments across multiple different storage nodes. Notably, the receiving node 311 does not wait for the data to be encoded before sending an acknowledgement to the client. Rather, an acknowledgement can be sent once the data is stored with sufficient redundancy. In some embodiments, this involves storing at least N copies of the data (either complete copies or fragmented copies). In certain embodiments at least three (N=3) copies of the data must be stored before an acknowledgement is sent.

In the example of FIG. 3A, the receiving node stores complete copies of the data on nodes 314 and 316 and stores k=12 data fragments $D_1, D_2, \ldots, D_k$ (the third copy) evenly across nodes 301-312 (i.e., one data fragment per node). It should be understood that the data layout shown in FIG. 3A is merely one example and any suitable data layout can be used.

After an acknowledgement is sent to the client, the node that owns the data D may schedule a erasure coding task to generate m coded fragments $C_1, C_2, \ldots, C_m$. In some embodiments, storage nodes maintain a queue of coding tasks and scheduling a task corresponds to adding a task to an appropriate task queue (sometimes referred to as "enqueuing" a task). In certain embodiments, the erasure coding task is scheduled and executed on the owner node itself. However, if the distributed storage system uses a flat cluster architecture the owner node may not have a local copy of the data. Thus, using this local approach, the owner node might be required to retrieve the data from remote nodes, generating unnecessary network traffic. For example, in FIG. 3A, it would be inefficient to perform the coding process on node 306.

Referring to FIG. 3B, unnecessary network traffic can be eliminated by executing erasure coding tasks on nodes that have a local copy of the data to be encoded. In particular, after an acknowledgement is sent to the client, the node that owns the new data may schedule an erasure coding task on a node that includes a local copy of the data (which may be the owner node itself, or some remote node). If there are multiple remote nodes that have a local copy of the data, the owner node may select one of the nodes using any suitable technique (e.g., random selection or load balancing).

In the example of FIG. 3B, node 306 is assumed to own the newly added D. After sending an acknowledging to the client, the owner node 306 may identify that both nodes 314 and 316 have local copies of the data D. The owner node may then select node 314 at random (or using another technique) and schedule/enqueue an erasure encoding task on that node. The remote node 314 subsequent executes the erasure coding task, which may include reading a copy of the data D from its locally attached storage devices and generating one or more coded fragments $C_1, C_2, \ldots, C_m$ therefrom. In the example of FIG. 3B, the remote node 314 generates m=4 coded fragments.

After the coded fragments are generated, the remote node 314 can store the coded fragments $C_1, C_2, \ldots, C_m$ across multiple different storage nodes according to a desirable data layout. For example, in FIG. 3B, the remote node 314 stores four (4) coded fragments $C_1, C_2, C_3$, and $C_4$ on nodes 313, 314, 315, and 316, respectively.

Once the data fragments and the coded fragments are safely stored, the complete copies of the data D can be deleted. In the example of FIG. 3B, the complete copies can be deleted from nodes 314 and 316.

FIG. 3C shows an example of a data layout after erasure coding is completed. In this example, sixteen (16) total fragments—including twelve (12) data fragments $D_1, D_2, \ldots, D_{12}$ and four (4) coded fragments $C_1, C_2, C_3$, and $C_4$— are stored evenly across sixteen nodes 301-316 (i.e., one fragment per node).

Figure 4:
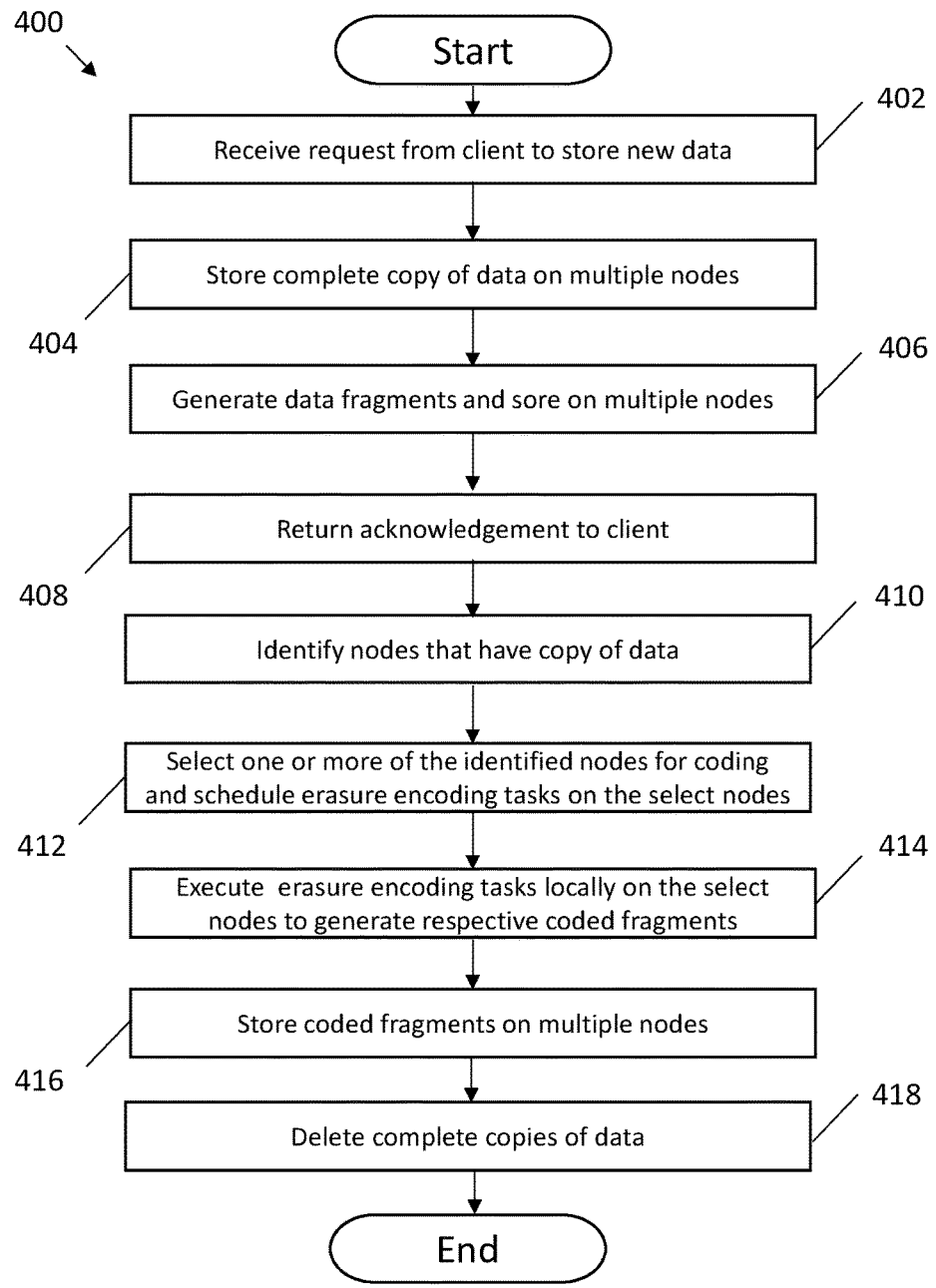
FIG. 4 is a flow diagram showing illustrative processing that can be implemented within one or more storage nodes 106 of a storage cluster 104 (FIG. 1), according to an embodiment of the disclosure.

FIG. 4 is a flow diagram showing illustrative processing that can be implemented within one or more storage nodes 106 of a storage cluster 104 (FIG. 1), according to an embodiment of the disclosure. Rectangular elements (typified by element 402) herein denoted "processing blocks," represent computer software instructions or groups of instructions. Alternatively, the processing blocks may represent steps performed by functionally equivalent circuits such as a digital signal processor circuit or an application specific integrated circuit (ASIC). The flow diagram does not depict the syntax of any particular programming language. Rather, the diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4 an illustrative process 400 begins at block 402, where a request to store new data may be received by a client (e.g., a user application). The request may be received and processed by an arbitrary storage node 104 (FIG. 1). At block 404, a complete copy of the data is stored on at least two different storage nodes. At block 406, the data may be divided into a plurality of fragments, and the data fragments may be stored across multiple different storage nodes. Any suitable data layout can be used. After the new data is stored across multiple storage devices, an acknowledgement may be returned to the client (block 408).

The new data is owned by a storage node, which does not necessarily have local copy of the data. At block 410, the owner node identifies that multiple nodes that include a complete copy of the data and selects one or more of those nodes for erasure coding. At block 412, the owner node schedules remote erasure coding tasks on each of the selected nodes. In some embodiments, the owner node tasks different remote nodes with generating different coded fragments.

At block 414, the erasure encoding tasks are executed locally on each of the selected nodes to generate coded fragments. If multiple nodes are selected, the encoding tasks may be performed in parallel. At block 416, the coded fragments are stored across multiple storage nodes. After the coded fragments are stored, the complete copies of the data can be deleted from the cluster (block 418).

Efficient Erasure Coding of Large Data Objects

Typically, data storage systems utilized for cloud systems implement erasure coding to protect user data. Traditionally, many cloud systems use erasure coding techniques that combine the use of mirroring and data encoding to facilitate fast write transactions the cloud systems. However, generally, current erasure coding techniques are not as responsive when dealing with large portions of data (i.e. large data objects, files, and/or blocks of data). Conventionally, improvements to erasure coding would be beneficial to the data storage industry.

In many embodiments, the current disclosure may enable implementation of an efficient erasure coding method for large portions of data. In various embodiments, a large portion of data may include a large data object, large file, and/or other large collections of data. In certain embodiments, the current disclosure may enable a data storage system to utilize multiple chunk and/or block types to efficiently store large portions of data.

Typically, data storage systems, such as elastic cloud storage, use a complex data protection as described above to provide reliable storage. Generally, during a data write, a reliable data storage system does not send any acknowledgement to the client until the data is properly protected. Traditionally, data storage systems providing data protection use the method described above (FIGS. 3A-3C) using chunks called type I chunks.

In many embodiments, data storage protection approaches for large objects vs regular objects may differ. In various embodiments, data storage systems providing data protection may support multiple storage APIs. In certain embodiments, a data storage system providing data protection may turn on special treatment for large objects to improve efficiency. In some embodiments, an object may be large when it cannot be stored in one chunk of storage, i.e. an object size greater than 128 mb for some systems. In these embodiments, the number of chunks needed to store a large object may be calculated using the formula below:

$$N = \text{ceil}\left(\frac{\text{object size}}{128 \text{ MB}}\right)$$

In most embodiments, suppose a large object may require exactly N chunks, i.e. chunks from 1 to N. In various embodiments, no acknowledgment may be sent to the client until the last chunk with object data (chunk N) is protected. In certain embodiments, a data storage system providing data protection may have time during processing before an acknowledgment may be sent and therefore may be more flexible when handling chunks from 1 to N−1.

In many embodiments, a data storage system providing protection may be enabled to utilize dedicated chunks to store most of a large object, the chunks from 1 to N−1. In various embodiments, these dedicated chunks may be called Type II chunks. In certain embodiments, Chunk N may be a normal chunk of type I as Chunk N may be enabled to be shared with other objects as it may be divided into several segments that may be spread among M chunks of Type I. In these embodiments, a large object may be stored in N−1+M chunks of two different types.

In most embodiments, a data storage system providing data protection may handle multiple different types of chunks to protect large portions of data. In various embodiments, a data storage system proving data protection may protect type II chunks by creating one copy per chunk and this copy may be a set of 12 data fragments $D_1$-$D_{12}$ which may be distributed among cluster nodes within the data storage system. In certain embodiments, at the same time, the node processing the large portion of data may keep the large portion of data (the contents) in volatile memory. In some embodiments, the node may keep the entire contents of the large portion of data in volatile memory. In other embodiments, the node may keep only the portion of the contents of the large portion of data being processed in volatile memory. In some embodiments, a data storage system providing data protection may protect type I chunks by initially mirroring the type I chunks, as described in FIGS. 3A-3C.

In most embodiments, the node processing the large portion of data may request the chunk content in its memory and encode the contents. In various embodiments, encoded objects may be distributed and/or stored using standard balancing policies.

In various embodiments, management of large data portion as described may generate minimal additional traffic. In various embodiments, just 0.33 of chunk size may be needed to store coding fragments. In certain embodiments, it may not be possible to keep the chunk to be encoded in volatile memory of the node that services the object write request. In these embodiments, if this is the case, the node that owns the new chunk, in most cases it may be a different node, may need to read all the data fragments to do the encoding. In other embodiments, the additional traffic generated may be 1.33 of chunk size, which may generate less traffic than with normal processing of type I chunks where the coefficient is 4.33.

In most embodiments, when a large object is created within a data storage system, the data storage system may send an acknowledgment after two events. In various embodiments, a first event may include that all Type II chunks may be created for the object are processed as described above. In certain embodiments, a second event may include all Type I chunks that contain the last segment of the large portion of data are protected via mirroring. In these embodiments, if any of the type II chunks created for the large portion of data cannot be protected, the data storage system fails the write request.

In many embodiments, implementation of encoding for both chunk types may use known erasure coding acceleration methods. In various embodiments, in particular, encoding operation may be accelerated using special processor instructions like VPERM for PowerPC and/or PSHUFB for Intel processors.

Figure 5:
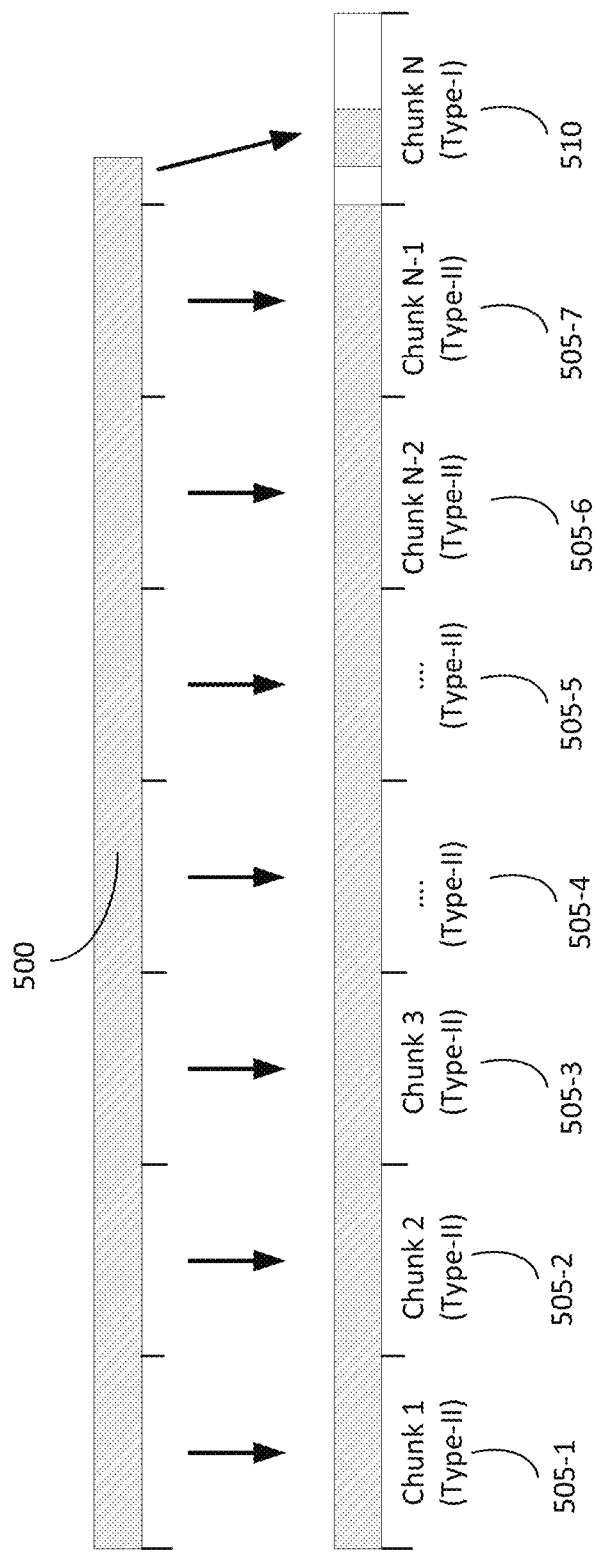
FIG. 5 is a simplified illustration of how a data storage system divides a large portion of data into multiple data chunks for processing, in accordance with an embodiment of the present disclosure.

Refer to the example embodiment of FIG. 5. FIG. 5 is a simplified illustration of how a data storage system divides a large portion of data into multiple data chunks for processing, in accordance with an embodiment of the present disclosure. As shown, a data storage system receives the large portion of data 500 to be written to the data storage system. A first step in processing the large portion of data 500 is to divide the large portion of data 500 into chunks. The large portion of data 500 is divided into "N" chunks, which include Type I chunks and Type II chunks. In most embodiments, Type I chunks contain portions of data from multiple client writes. In other embodiments, Type II chunks may be completely filled with data from a single client write to the data storage system. In this embodiment, N chunks are created, which include N−1 of type II chunks and one (1) type I chunk. As shown, Chunks (505-1 . . . 7, Generally 505) are completely filled with data from the large portion of data 500. Chunk 510, a type I chunk, contains residual data from the large portion of data 500 which will not fill an entire chunk. The data storage system will process the large portion of data 500 by processing chunks 505 and chunk 510. The data storage system can acknowledge the client request to write the large portion of data 500 once all chunks (chunks 505 and Chunks 510) are protected.

Figure 6A:
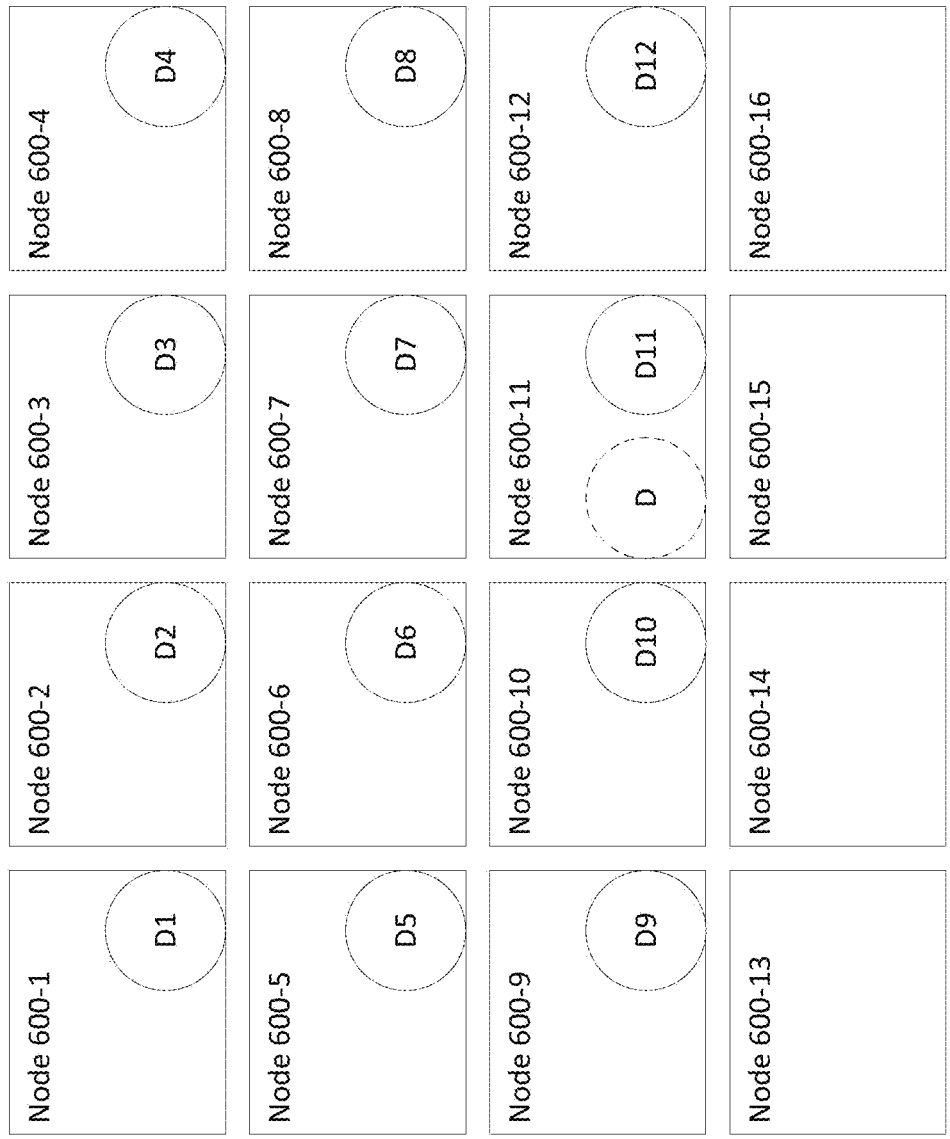
FIG. 6A is a simplified illustration of a first state of a technique for efficiently performing erasure coding within a distributed data storage system, in accordance to an embodiment of the present disclosure
Figure 6B:
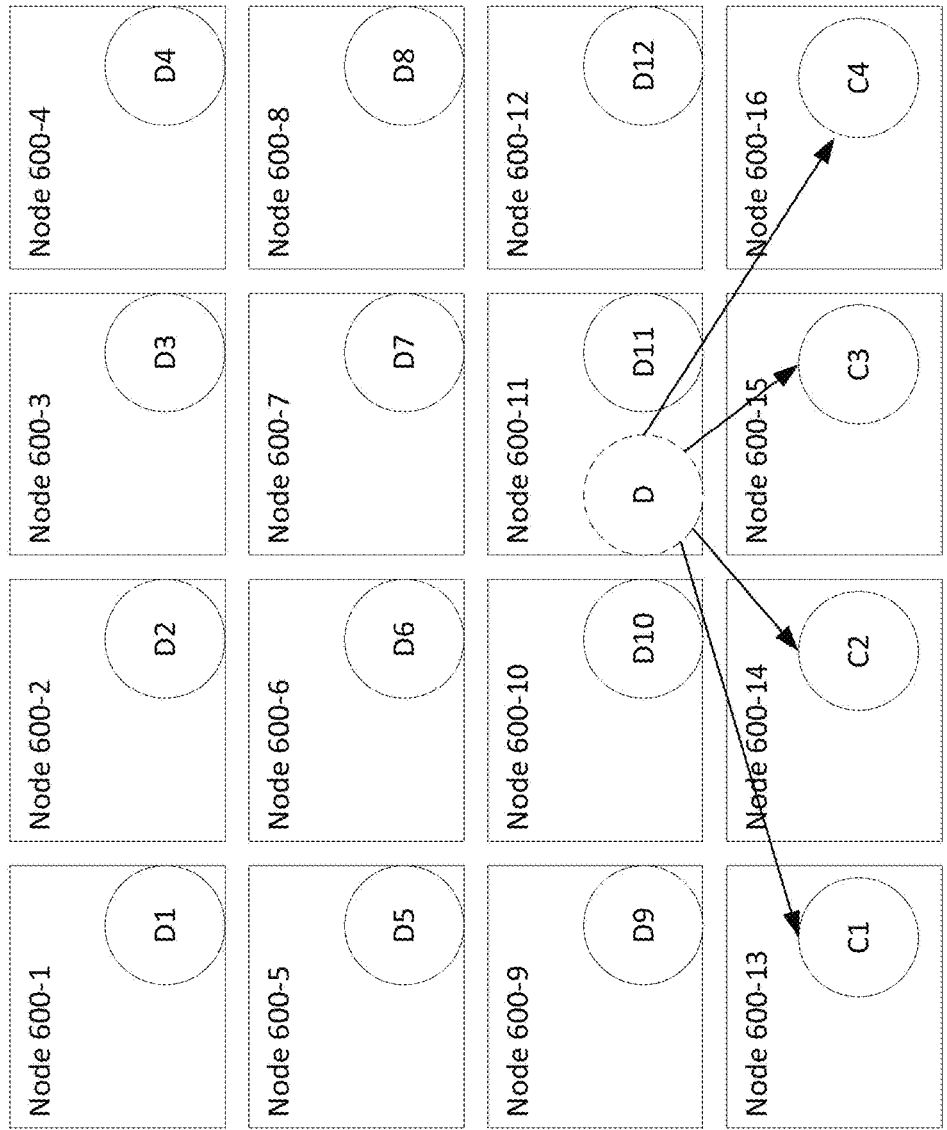
FIG. 6B is a simplified illustration of a second state of a technique for efficiently performing erasure coding within a distributed data storage system, in accordance to an embodiment of the present disclosure.

Refer to the example embodiments of FIGS. 6A and 6B. FIG. 6A is a simplified illustration of a first state of a technique for efficiently performing erasure coding within a distributed data storage system, in accordance to an embodiment of the present disclosure. In FIG. 6A, distributed data storage system (system) 600 includes a plurality of nodes (600-1 . . . 16, 600 generally) with sixteen (16) nodes shown in this example. In various embodiments, a system 600 may include more or less than sixteen (16) nodes. Any node 600 may be the same or similar to the node 106' of FIG. 1A. When a new large portion of data D is added to the system (e.g., via a client 102 request), the system 600 is enable to divide the large portion of data D into K of Type II fragments $D_1, D_2, \ldots, D_k$, M of type I fragments (processed as shown in FIGS. 3A-3C), and is enabled to generate P coded fragments $C_1, C_2, \ldots, C_P$ from the Type II fragments. System 600 is enabled to process, store, and distribute the type II fragments and associated coded fragments across various nodes 600 using a suitable data layout. System 600 processes the type I fragments separately, as shown in FIGS. 3A-3C.

In this embodiment, any of nodes 600 are enabled to receive a write request for a large portion of data. For example, in an embodiment, node 600-11 received a request to write the large portion of data D to system 600. Node 600-11 is enabled to process the large portion of Data D by dividing the large portion of Data D into Type I and Type II fragments. In this embodiment, twelve (12) type II fragments ($D_1$-$D_{12}$) are created and distributed to unique nodes of nodes 600. As each of the twelve type II fragments are created, Node 600-11 stores contents of each respective fragment in volatile memory.

FIG. 6B is a simplified illustration of a second state of a technique for efficiently performing erasure coding within a distributed data storage system, in accordance to an embodiment of the present disclosure. In this state, node 600-11 processes contents of each respective type II fragment ($D_1$-$D_{12}$) stored in volatile memory and encodes the contents into coded fragments ($C_1$-$C_4$) distributed across various of nodes 600 using a suitable data layout. The Type I fragments created from the large portion of data D are processed as described in FIGS. 3A-3C.

Figure 7:
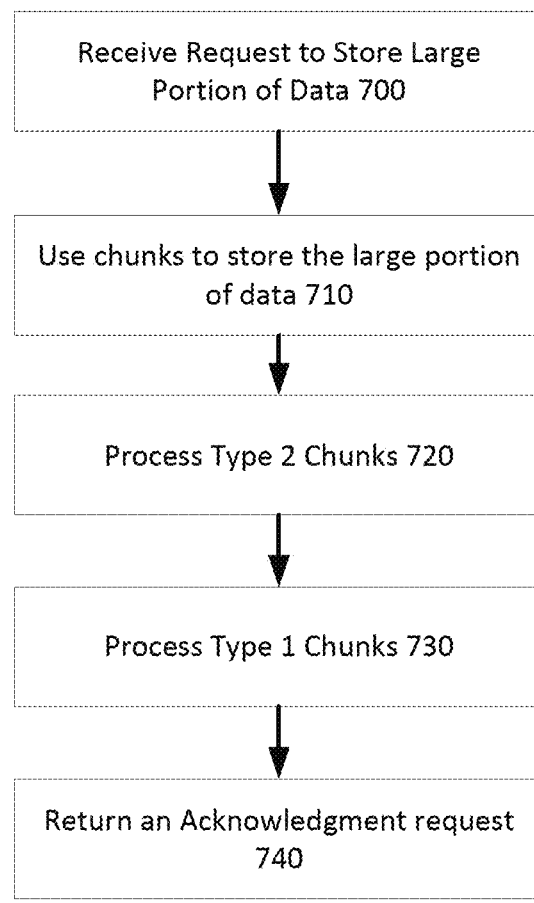
FIG. 7 is a simplified flowchart of a method of efficiently performing erasure coding within a distributed data storage system, in accordance with an embodiment of the present disclosure.

Refer to the example embodiment of FIG. 7. FIG. 7 is a simplified flowchart of a method of efficiently performing erasure coding within a distributed data storage system, in accordance with an embodiment of the present disclosure. As shown, the method begins at Step 700 where a request to store a large portion of data is received from a client (i.e., a user application). The request may be received and processed by an arbitrary storage node 104 (FIG. 1) within a distributed data storage system, such as described in FIGS. 6A and 6B. At step 710, the storage node 104 uses type I chunks and type II chunks to store the large portion of data. The storage node 104 divides the large portion of data into type I chunks and type II chunks to process each type of chunk separately. At step 720, the storage node 104 processes each of the Type II chunks. At step 730, the storage node 104 processes each of the type I chunks. Upon completion of processing of each of the type I and type II chunks, the storage node 104 returns an acknowledgement to the write request at step 740.

Figure 8:
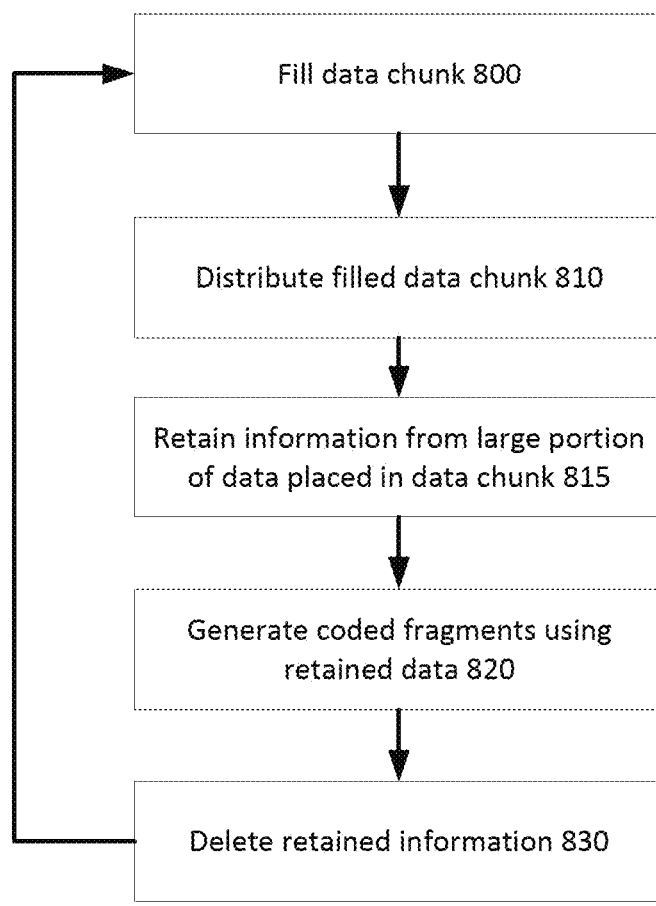
FIG. 8 is a simplified flowchart of a method of processing Type II chunks for large portions of data within a distribute data storage system, in accordance with an embodiment of the present disclosure.

Refer to the example embodiment of FIG. 8. FIG. 8 is a simplified flowchart of a method of processing Type II chunks for large portions of data within a distribute data storage system, in accordance with an embodiment of the present disclosure. To process a large portion of data using Type II chunks, a storage node 104 (FIG. 1) fills type II data chunks (Step 800) and distributes the filled data chunks (Step 810) throughout the distributed data storage system. Storage node 104 retains information placed in the type II data chunks in volatile memory (Step 815) and generates coded fragments using the retained data (Step 820). Upon completion of creating the coded fragments, the storage node 104 deletes the retained information (Step 830) and continues filling the next Type II data chunk (Step 800).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
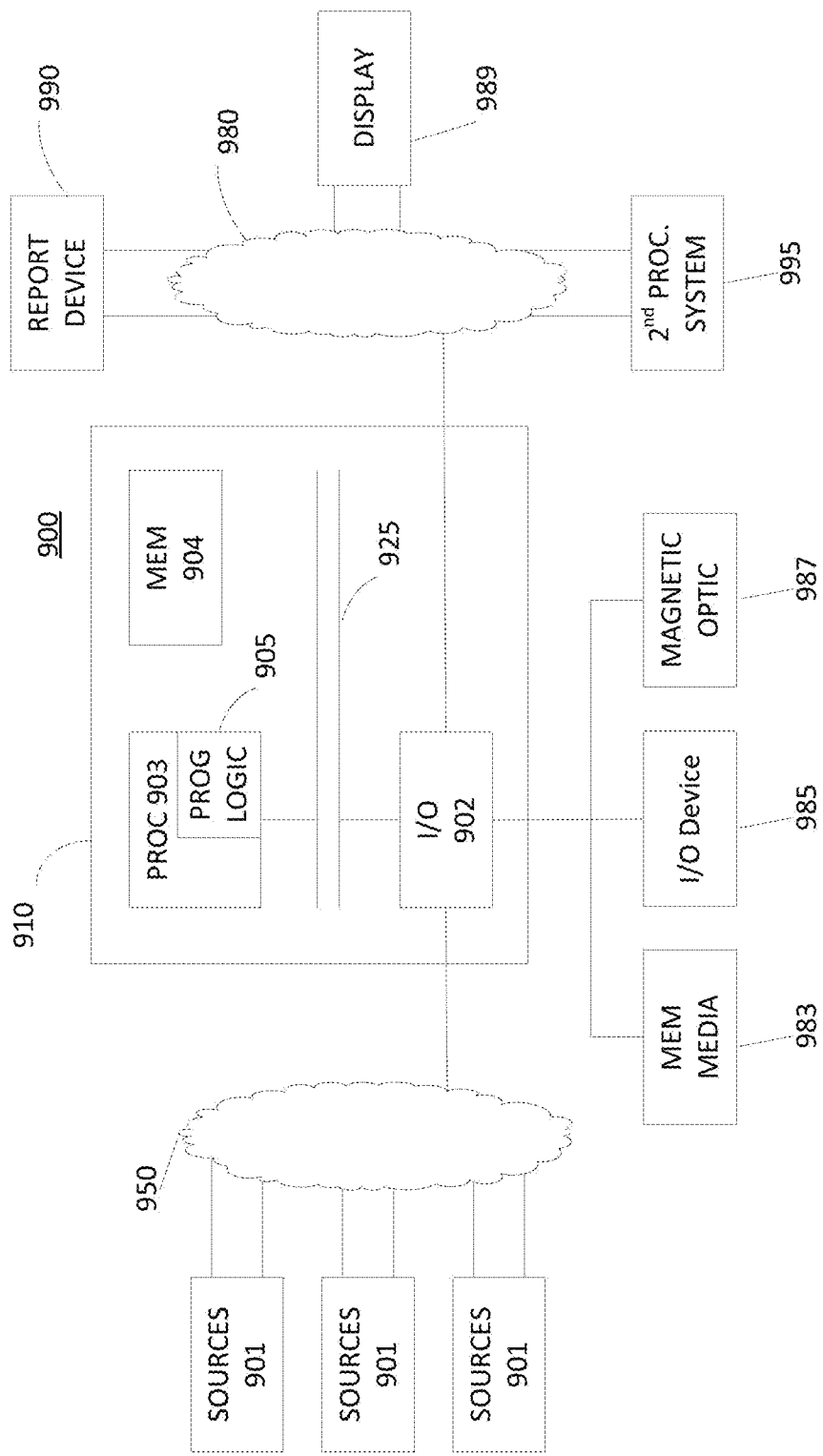
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The I/O port 902 may provide connectivity to memory media 983, I/O devices 985, and drives 987, such as magnetic drives, optical drives, or Solid State Drives (SSD). When the program code is loaded into memory 904 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
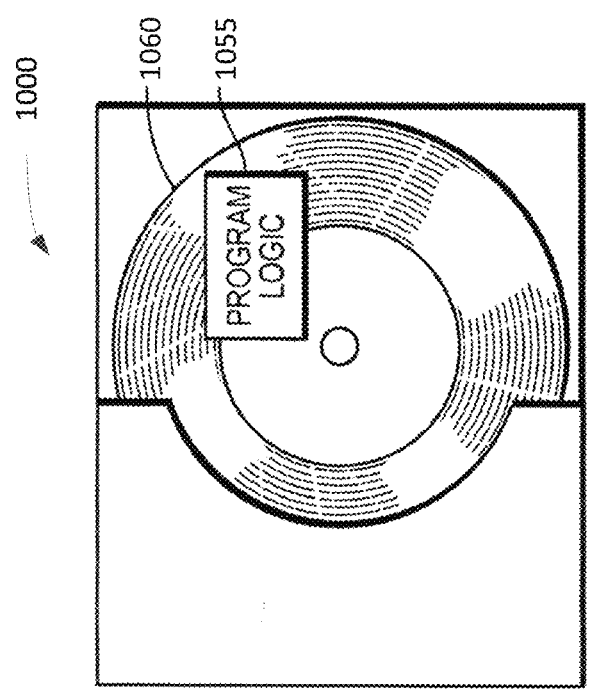
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for use with a distributed storage system comprising a plurality of storage nodes each having attached storage devices, the computer-executable method comprising:
    receiving a request, at a first storage node of the plurality of storage nodes, to store a large portion of data;
    using at least one of a first type of data chunk and a plurality of a second type of data chunks to store the large portion of data
    processing each of the plurality of the second type of data chunks by:
        filling a first data chunk, of the plurality of the second type of data chunks, with a first portion of data from the large portion of data, wherein the first portion of data completely fills the first data chunk;
        distributing the first data chunk to one of the plurality of storage nodes;
        retaining, at the first storage node, the content of the first portion of data;
        executing, on the first storage node, an erasure encoding task to generate coded fragments using the content of the first portion of data;
        distributing the generated coded fragments to the plurality of storage nodes; and
        deleting the content of the first portion of data from the first storage node;
    processing each of the at least one of the first type of data chunk; and
    returning an acknowledgement to the request.

2. The computer-executable method of claim 1, wherein the returning an acknowledgment to the request is sent after each of the first type of data chunk and each of the second type of data chunks are protected.

3. The computer-executable method of claim 1, wherein the large portion of data is represented by at least one of a first type of data chunk and a plurality of a second type of data chunk.

4. The computer-executable method of claim 1, wherein the processing each of the at least one of the first type of data chunk comprises:
    mirroring each of the at least one of the first type of data chunks.

5. The computer-executable method of claim 1, wherein during the distribution of the second type of data chunk and associated generated coded fragments, each of the second type of data chunk and associated generated coded fragments are distributed to unique storage nodes of the plurality of storage nodes.

6. The computer-executable method of claim 1, further comprising:
    upon failure to protect any of the second type of data chunk created, returning a failure signal.

7. A system, comprising:
    a distributed storage system including a plurality of storage nodes each having attached storage devices; and
    computer-executable program logic encoded in memory of one or more computers enabled for use with the distributed storage system, wherein the computer-executable program logic is configured for the execution of:
    receiving a request, at a first storage node of the plurality of storage nodes, to store a large portion of data;
    using at least one of a first type of data chunk and a plurality of a second type of data chunks to store the large portion of data
    processing each of the plurality of the second type of data chunks by:
        filling a first data chunk, of the plurality of the second type of data chunks, with a first portion of data from the large portion of data, wherein the first portion of data completely fills the first data chunk;
        distributing the first data chunk to one of the plurality of storage nodes;
        retaining, at the first storage node, the content of the first portion of data;
        executing, on the first storage node, an erasure encoding task to generate coded fragments using the content of the first portion of data;
        distributing the generated coded fragments to the plurality of storage nodes; and
        deleting the content of the first portion of data from the first storage node;
    processing each of the at least one of the first type of data chunk; and
    returning an acknowledgement to the request.

8. The system of claim 7, wherein the returning an acknowledgment to the request is sent after each of the first type of data chunk and each of the second type of data chunks are protected.

9. The system of claim 7, wherein the large portion of data is represented by at least one of a first type of data chunk and a plurality of a second type of data chunk.

10. The system of claim 7, wherein the processing each of the at least one of the first type of data chunk comprises:
    mirroring each of the at least one of the first type of data chunks.

11. The system of claim 7, wherein during the distribution of the second type of data chunk and associated generated coded fragments, each of the second type of data chunk and associated generated coded fragments are distributed to unique storage nodes of the plurality of storage nodes.

12. The system of claim 7, wherein the computer-executable program logic is further configured for the execution of:
    upon failure to protect any of the second type of data chunk created, returning a failure signal.

13. A computer program product for use with a distributed storage system comprising a plurality of storage nodes each having attached storage devices, the computer program product comprising:
    a non-transitory computer readable medium encoded with computer-executable code, the code configured to enable the execution of:
    receiving a request, at a first storage node of the plurality of storage nodes, to store a large portion of data;
    using at least one of a first type of data chunk and a plurality of a second type of data chunks to store the large portion of data
    processing each of the plurality of the second type of data chunks by:
        filling a first data chunk, of the plurality of the second type of data chunks, with a first portion of data from the large portion of data, wherein the first portion of data completely fills the first data chunk;

distributing the first data chunk to one of the plurality of storage nodes;

retaining, at the first storage node, the content of the first portion of data;

executing, on the first storage node, an erasure encoding task to generate coded fragments using the content of the first portion of data;

distributing the generated coded fragments to the plurality of storage nodes; and deleting the content of the first portion of data from the first storage node;

processing each of the at least one of the first type of data chunk; and returning an acknowledgement to the request.

14. The computer program product of claim 13, wherein the returning an acknowledgment to the request is sent after each of the first type of data chunk and each of the second type of data chunks are protected.

15. The computer program product of claim 13, wherein the large portion of data is represented by at least one of a first type of data chunk and a plurality of a second type of data chunk.

16. The computer program product of claim 13, wherein the processing each of the at least one of the first type of data chunk comprises:

mirroring each of the at least one of the first type of data chunks.

17. The computer program product of claim 13, wherein during the distribution of the second type of data chunk and associated generated coded fragments, each of the second type of data chunk and associated generated coded fragments are distributed to unique storage nodes of the plurality of storage nodes.

* * * * *